United States Patent
Berman (12) 
(10) Patent No.: US 7,327,408 B1
(45) Date of Patent: Feb. 5, 2008

(54) ILLUMINATOR THAT GENERATES LINEARLY POLARIZED LIGHT FOR MICRODISPLAY BASED LIGHT ENGINE

(75) Inventor: Arthur Berman, San Jose, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 611 days.

(21) Appl. No.: 10/989,019

(22) Filed: Nov. 15, 2004

(51) Int. Cl.
*H04N 5/74* (2006.01)
*H04N 9/31* (2006.01)

(52) U.S. Cl. ............... 348/794; 348/766; 348/790; 348/751; 348/752; 348/762; 348/744; 362/84; 362/456; 362/19; 353/20; 353/33; 353/37

(58) Field of Classification Search ............ 348/766, 348/767, 762, 759, 752, 771, 761, 751, 756, 348/798, 744, 790, 794, 758; 353/8, 20, 353/81; 362/84, 19, 546, 296, 297; 313/115, 313/116, 36, 483, 486, 485, 488, 489; 359/831, 359/800

See application file for complete search history.

(56) References Cited

U.S. PATENT DOCUMENTS

| | | | |
|---|---|---|---|
| 3,707,642 A * | 12/1972 | Thornton, Jr. | 313/486 |
| 3,886,396 A * | 5/1975 | Hammer et al. | 313/486 |
| 4,695,763 A * | 9/1987 | Ogasawara et al. | 313/487 |
| 4,797,594 A * | 1/1989 | Sigai et al. | 313/488 |
| 4,868,383 A * | 9/1989 | Kurtz et al. | 250/228 |
| 5,079,678 A * | 1/1992 | Parker | 362/84 |
| 5,535,054 A * | 7/1996 | Shibuya | 359/487 |
| 5,875,006 A * | 2/1999 | Nagae et al. | 348/751 |
| 6,247,817 B1 * | 6/2001 | Ogawa et al. | 353/38 |
| 6,362,570 B1 * | 3/2002 | Popov et al. | 313/634 |
| 6,433,935 B2 * | 8/2002 | Curley et al. | 359/630 |
| 6,490,104 B1 * | 12/2002 | Gleckman et al. | 359/819 |
| 6,538,372 B2 * | 3/2003 | Vose et al. | 313/486 |
| 6,607,794 B1 * | 8/2003 | Wilson et al. | 428/34.1 |
| 6,796,663 B2 * | 9/2004 | Detro et al. | 353/122 |
| 6,811,272 B2 * | 11/2004 | O'Connor et al. | 362/19 |
| 6,909,556 B2 * | 6/2005 | Berman et al. | 359/634 |
| 6,934,066 B2 * | 8/2005 | Berman et al. | 359/256 |
| 6,982,829 B1 * | 1/2006 | Berman | 359/495 |
| 6,999,237 B2 * | 2/2006 | Berman et al. | 359/618 |
| 7,008,071 B2 * | 3/2006 | Buelow et al. | 362/84 |
| 7,012,755 B1 * | 3/2006 | Berman | 359/628 |
| 7,023,602 B2 * | 4/2006 | Aastuen et al. | 359/247 |
| 7,040,774 B2 * | 5/2006 | Beeson et al. | 362/84 |
| 7,048,424 B2 * | 5/2006 | McClurg et al. | 362/552 |
| 7,123,311 B2 * | 10/2006 | Yamakawa | 348/744 |
| 7,128,420 B2 * | 10/2006 | Kapellner et al. | 353/38 |
| 7,136,035 B2 * | 11/2006 | Yoshida | 345/87 |

(Continued)

*Primary Examiner*—David Ometz
*Assistant Examiner*—Jean W. Désir
(74) *Attorney, Agent, or Firm*—Martine Penilla & Gencarella, LLP (57) ABSTRACT

A hollow sphere with a scattering (e.g., white diffusive) interior surface directs light input from at least one input light source to an exit. In one embodiment, an internal hot mirror and phosphor are positioned to intercept the input light on which visible light is reflected and ultraviolet light is directed to the phosphor for conversion to visible light. The exit has a reflective polarizer that passes light of a selected polarization to an output. Light of other polarization(s) is reflected back into the sphere where it becomes unpolarized because of reflections and may eventually be returned to the exit at the selected polarization.

27 Claims, 6 Drawing Sheets

U.S. PATENT DOCUMENTS

| | | |
|---|---|---|
| 7,180,646 B2 * | 2/2007 | Bell et al. .................... 359/237 |
| 7,184,218 B1 * | 2/2007 | Berman et al. ............. 359/649 |
| 7,210,806 B2 * | 5/2007 | Holman et al. ............... 362/19 |
| 7,215,391 B2 * | 5/2007 | Kuan et al. .................. 349/106 |
| 7,222,968 B2 * | 5/2007 | Magarill et al. .............. 353/31 |
| 7,237,899 B2 * | 7/2007 | Ma et al. ....................... 353/20 |
| 7,239,360 B2 * | 7/2007 | Bassi et al. .................. 348/745 |
| 2003/0202163 A1 * | 10/2003 | Detro et al. ................. 353/122 |
| 2004/0008418 A1 * | 1/2004 | Berman ....................... 359/634 |

* cited by examiner

FIGURE #2: KEY COMPONENTS OF AN ILLUMINATOR THAT OUTPUTS LINEARLY POLARIZED LIGHT

ILLUMINATOR THAT GENERATES LINEARLY POLARIZED LIGHT FOR MICRODISPLAY BASED LIGHT ENGINE

CROSS REFERENCE TO RELATED APPLICATIONS AND CLAIM OF PRIORITY

This invention claims priority to the following co-pending U.S. patent application, which is incorporated herein by reference, in its entirety:

Berman, U.S. patent application Ser. No. 10/845,459, entitled "An Illuminator that Outputs Linearly Polarized Light and that is Suitable for use in Microdisplay Based Light Engine Applications," filed, May 13, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The invention disclosed in this document is an illuminator that outputs linearly polarized light. More particularly, the illuminator is suitable for incorporation in LCoS microdisplay based light engines of the type used in video projector applications.

2. Discussion of Background

Figure 1:
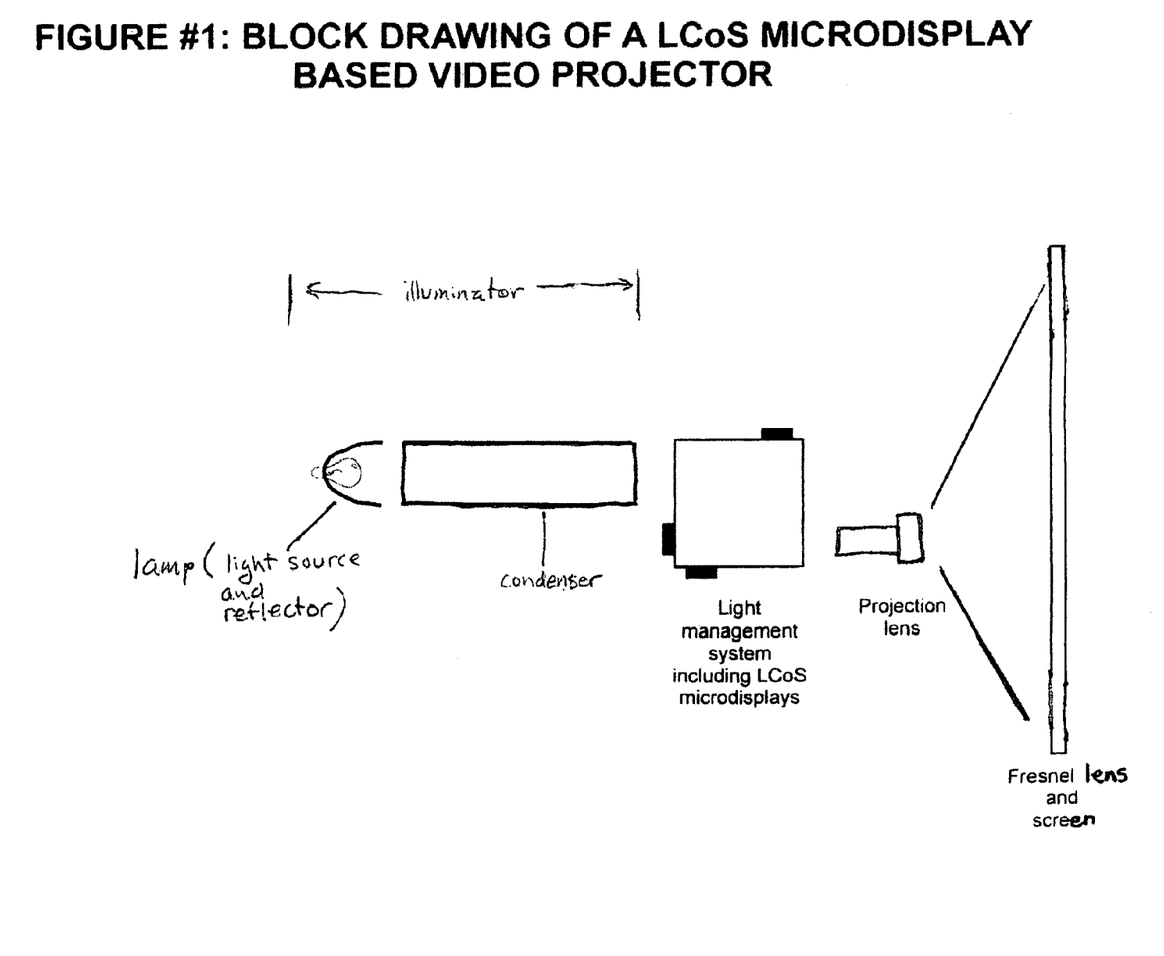
FIG. 1 is a block diagram of a LCoS microdisplay based video projector according to an embodiment of the present invention.

A block drawing of a set of components behind the screen of a LCoS microdisplay based rear projection video display (such as a TV) is illustrated in FIG. 1. To the left of the figure, the light source and condenser elements are collectively called the illuminator.

The light source is usually a mercury short arc lamp. This type of lamp emits an output light beam that is round and has a spatially non-homogeneous intensity profile. One function of the condenser is to shape and size the output light beam to match that of the rectangular microdisplays of the kernel and to homogenize the light intensity within the output light beam. Other functions of the condenser are to set the f# of the output light beam and to remove the infrared and the ultra violet portions of the light source emission spectrum. Some condensers also remove undesired portions of the visible spectra from the light beam. (A common example of this function is the removal of the "yellow" spike from the emission spectra produced by the mercury short arc lamp.) Additional requirements placed on the illuminator are that it be physically compact and inexpensive.

The subject of this disclosure relates to the polarization of the light output by the illuminator. The lamp itself outputs unpolarized light. In many applications the illuminator also outputs unpolarized light and this is acceptable. Other applications require that the illuminator output linearly polarized light.

There are a number of conventional techniques known to the art by which to produce an illuminator that outputs linearly polarized light. Three of the more widely used techniques are as follows:

- The inclusion of a linear polarizer in the illuminator. The polarizer is typically a PBS or a reflective polarizer. In either case, the big disadvantage of this approach is the loss of a minimum of half the light produced by the illuminator.
- The inclusion of a so-called "fly's eye" recombination system into the illuminator. Such an illuminator includes a lamp with a parabolic reflector, a fly's eye lens, a polarization rotator array plate and a second fly's eye lens. This type of system requires careful alignment and is quite expensive.
- The inclusion of an integrating rod based recombination system into the illuminator. Such an illuminator includes a lamp with an elliptical reflector and a modified integrating rod. The modification consists of the addition of a reflective aperture and a quarter waveplate at the input end of the rod and the addition of a reflective polarizer at the rod output. The resulting illuminator certainly outputs linearly polarized light but the intensity is found to be only a modest increase over the approach of simply inserting a polarizer into the illuminator.

SUMMARY OF THE INVENTION

The present inventors have realized an improved illuminator. The illuminator is particularly well suited for projection systems and LCoS projection televisions. In one embodiment, the present invention provides a device, comprising, an integrating enclosure having an entrance aperture, an exit aperture, and a reflective linear polarizer coupled to the exit aperture.

In another embodiment the present invention is an illuminator, comprising, an integrating enclosure having an entrance aperture and an exit aperture, at least one light source coupled to the entrance and configured to direct light into the integrating enclosure, and a reflective linear polarizer coupled to the exit.

In yet another embodiment, the present invention is a Liquid Crystal on Silicon (LCoS) projection television, comprising, a light management system comprising, a prism assembly having an input face, a set of processing faces, and an output face, the prism assembly being configured to split an input light beam into component light beams, individually direct the component light beams to an individual one of the processing faces, recombine portions of the component light beams reflected from the processing faces, and output the recombined light beams through the output face, and a light source, comprising, an integrating enclosure having an entrance aperture, an exit aperture, and a reflective linear polarizer coupled to the exit aperture, wherein, the prism assembly further comprises a set of reflective microdisplays, each microdisplay is mounted on one of the processing faces and configured to modulate and reflect light directed at the processing face upon which the microdisplay is mounted, and each microdisplay is configured to modulate light with content corresponding to a color of the component light beam directed at the processing face upon which the microdisplay is mounted.

The present invention includes a method of producing light suitable for use in an optical device, comprising the steps of injecting light into a diffuse scattering enclosure having a polarization sensitive reflector, and directing light emanating from the polarization sensitive reflector to an integrating rod. The light from the integrating rod is then provided to a kernel of an image projection system, such as a LCoS projection television.

The present invention includes the use of a coated substrate comprising, for example, a material having high transmission in the ultra violet portions of the light spectrum with a hot mirror coating on an incident side and a phosphor (sensitive to ultra violet) on an exit side of the substrate. The coated substrate is, for example, positioned to intercept light input to the integrating sphere such that visible light is reflected by the hot mirror coating and ultraviolet light is directed through the substrate to the phosphor. The phosphor is selected to convert the ultraviolet light to visible light.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The invention disclosed in this document is an illuminator configured to output linearly polarized light. The disclosed illuminator is compact, inexpensive, highly efficient, and is well suited for light management systems, particularly for use in projection televisions and other applications.

Figure 2:
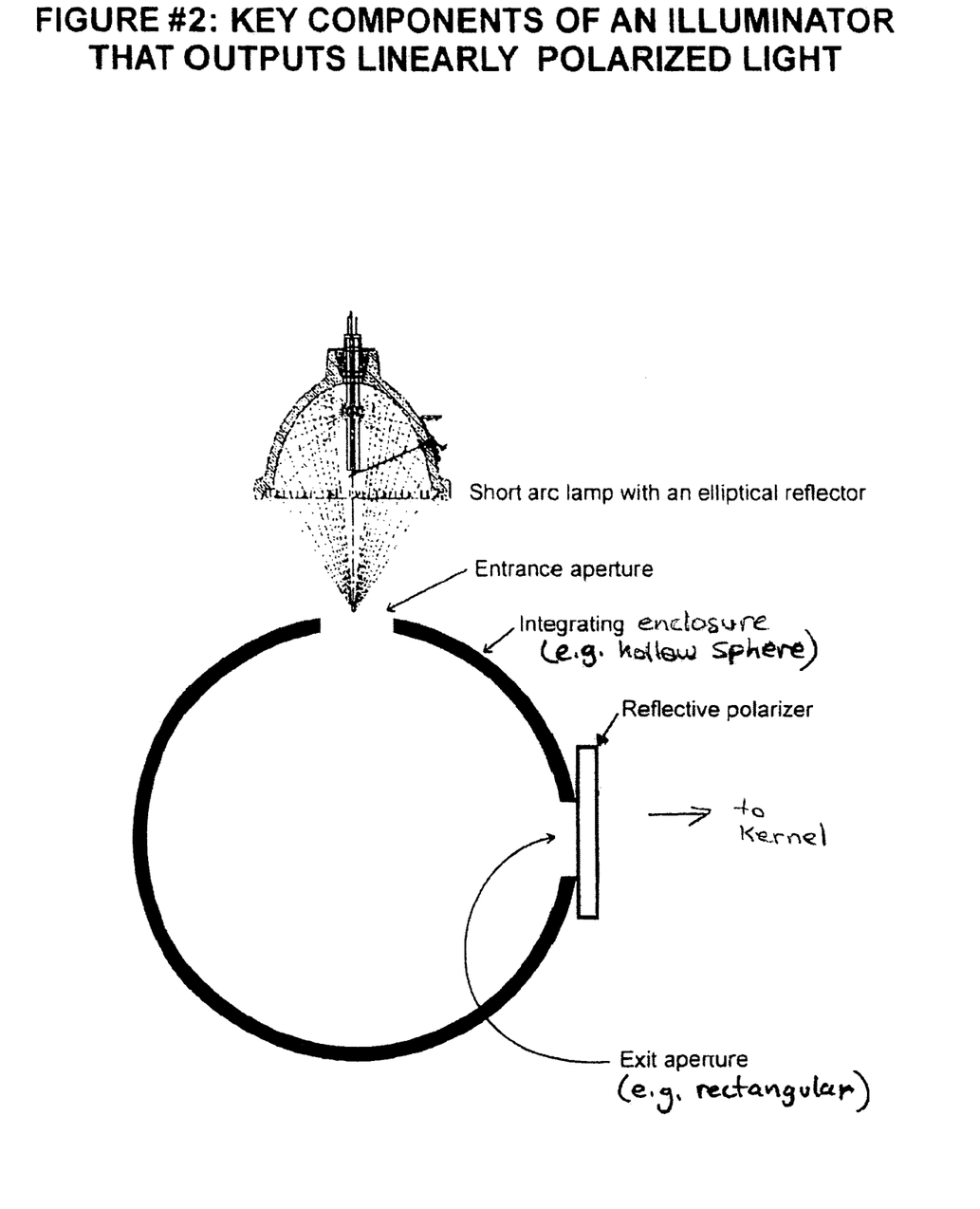
FIG. 2 is an illustration of key components of an illuminator that outputs linearly polarized light according to an embodiment of the present invention.

The basic configuration of the illuminator is illustrated in FIG. 2. As shown, the light source is a short arc lamp with an elliptical reflector. The non-homogeneous, unpolarized light produced by the lamp is focused through a small entrance aperture in the wall of an integrating sphere. Once in the sphere, the light beam is scattered by impact with the interior wall of the sphere. The scattering serves to homogenize the intensity of the light within the sphere. Some of the light eventually encounters the exit aperture.

A reflective linear polarizer is positioned at the exit aperture. One polarization of light (S for example) is passed by the reflective polarizer and leaves the integrating enclosure via the exit aperture. In one embodiment, the exit aperture is shaped in proportion to the shape of a light modulator or other device that eventually operates on or interacts with light that has exited the illuminator. In one embodiment, the exit aperture is rectangularly shaped in proportion to a reflective LCoS microdisplay. The other polarization, the P component, is reflected back into the sphere. This portion of the light beam once again is scattered multiple times within the sphere. In doing so, the light is fully depolarized. Eventually, some of the light will encounter the exit aperture where, once again, the S polarized component will be transmitted. The P polarized component is again recirculated. Since the sphere can be highly efficient, most of the light eventually leaves the sphere with a S polarization.

An optional integrating rod (not shown) can further shape and spatially homogenize the intensity of the S polarized light beam. The S polarized light then enters other optical components (not shown) that, for example, further focus, filter, shape, and/or modulate the beam.

Several points concerning the configuration of the disclosed illuminator are as follows:

The illuminator can output either P or S linearly polarized light. The orientation of the axis of linear polarization is determined by the orientation of the transmission axis of the reflective polarizer located at the exit aperture.

The integrating enclosure can be a hollow ball (e.g., sphere) in which the inner wall is coated with a highly scattering material (e.g., a white material such aluminum oxide or magnesieum oxide). Alternately, the integrating enclosure can be made of a solid material such as glass that is coated on the outside with a highly reflective or scattering (e.g., white) material.

It is possible to increase the light output by the illuminator by having two or more lamps input light into the integrating sphere.

Figure 3:
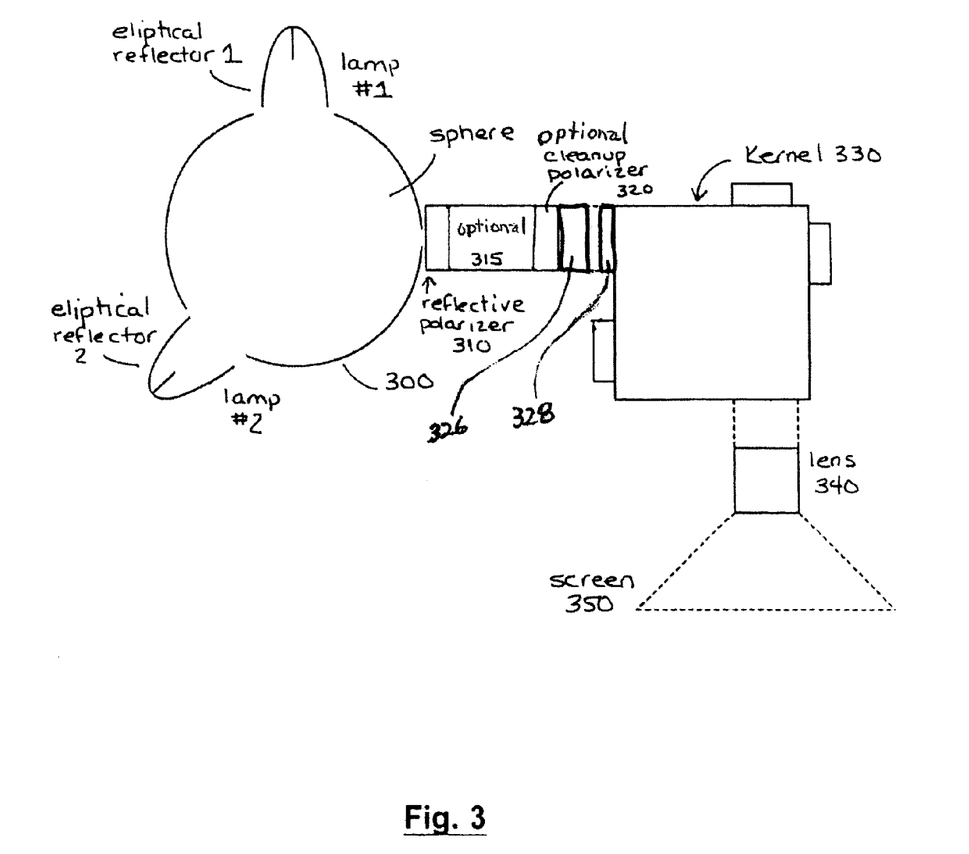
FIG. 3 is an illustration of a light management system having a dual lamp illuminator according to an embodiment of the present invention.

FIG. 3 is an illustration of a light management system having a dual lamp illuminator according to an embodiment of the present invention. An illuminator 300 has 2 lamps (lamp #1 and lamp #2) inputting unpolarized light into a scattering sphere, output light passes through a reflective polarizer 310, optional integrating rod 315, optional cleanup polarizer 320, UV and IR filters 326, and additional lenses 328. The integrating rod 315 (a.k.a. light pipe) further conditions the light exiting the scattering sphere. The further conditioning includes, for example, further homogenization, and adjustment of an f# of the light (e.g., adjusting, for example, the rectangular size of the polarized light beam. The output light is input into a kernel 330 where it is manipulated to integrate a video image. The video image exits the kernel 330, is focused by lens 340 and projected onto screen 350.

One technique to increase the degree of linear polarization of the output light is to include a "clean up" reflective polarizer 320 at the output of the integrating rod 315. The transmission axis of the clean up reflective polarizer 320 should be parallel to that of the linear polarizer (310) at the sphere exit aperture.

FIG. 3 is an example embodiment. Many other configurations of kernels, or other post light source devices may utilize the illuminator 300. Furthermore, as discussed herein, the illuminator 300 may be configured with one, two, or more light sources. The light sources may be similar to each other, or they may be light sources that are of different specifications. For example, lamp #1 may be stronger in red wavelengths and lamp #2 may be stronger in blue or green wavelengths. The qualities of any one or more lamps to be selected based on system and engineering requirements.

Figure 4:
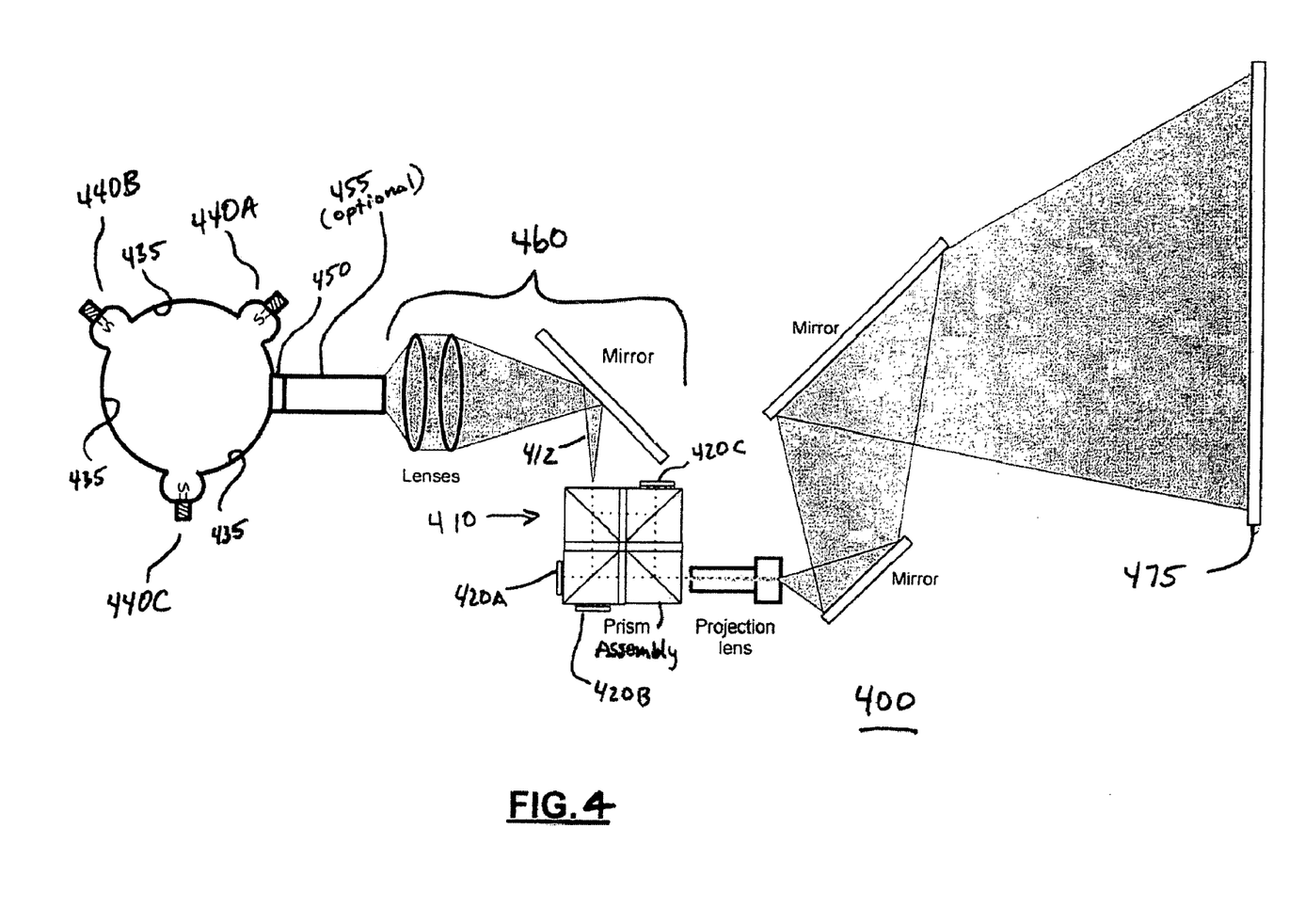
FIG. 4 is a drawing of major components of a Liquid Crystal on Silicon (LCoS) projection display device 400 according to an embodiment of the present invention.

FIG. 4 is a drawing of major components of a Liquid Crystal on Silicon (LCoS) projection display device 400 according to an embodiment of the present invention. The display-device 400 includes kernel 410 which comprises a prism assembly and a set of reflective LCoS microdisplays 420A, 420B, and 420C. Each of the microdisplays are energized by microdisplay electronics (not shown) with content corresponding to a component color of an image being displayed by the display device. The microdisplay electronics, for example, split a video image into streams of digital data content, each stream corresponding to one of the color components. The component colors are, for example, Red, Green, and Blue, and/or combinations of other component colors.

The prism assembly is an assembly of beam splitting components (e.g., Polarizing Beam Splitters, PBSs, Dichroic Beam Splitters, etc.) and optical elements (e.g., dichroics, filters, waveplates, etc.) configured to split input light 412 into a set of component light beams, direct each component light beam to a processing face of the kernel 410 prism assembly. After passing through the processing face, each component light beam is modulated by reflection from a microdisplay and returns back through the processing face. The prism assembly of kernel 410 illustrates three processing faces, one corresponding to each microdisplay.

Each microdisplay is, for example, non-movably mounted either directly or via a mounting mechanism to its corresponding processing face (e.g., a bezel surrounding an optical area of the microdisplay which may include a sealed reservoir of index matching fluid coupling the optical area of the microdisplay to the processing face). Each microdisplay is energized with the component color corresponding to the component light beam directed to its processing face. The component light beam is then modulated and reflected by the microdisplay. The prism assembly combines the modulated reflected component light beam and directs the combined lights to an exit face where they are projected onto a display screen 475. In one embodiment, the display screen 475 is the display of a LCoS projection television.

The prism assembly of kernel 410 is, for example, a quad style prism assembly comprising 4 beam splitting components arranged in a cube. In one embodiment, an image projector according to the present invention includes a prism assembly in which the main optical components of the prism assembly (beam splitters) are liquid coupled. The beam splitters are set, for example, in prism assembly pathlength matched positions with joints between the beamsplitters. The joints are filled with liquid (e.g., an index matching fluid). A frame and/or a mounting plate in conjunction with an adhesive or other seal maintains the fluid within the prism assembly. Optical elements such as ColorSelects (wavelength specific retarder products by ColorLink Corporation), dichroics, etc, if needed for the prism assembly design, may also be inserted into the joints and immersed in the index matching fluid. The beam splitters each comprise 2 prisms abutted on their diagonals and set in beamsplitter pathlength matched positions. A beam splitting layer is disposed on one or both of the diagonals. The beam splitting layer may be any of, for example, a polarizing beam splitting thin film (a PBS beamsplitter), a single color cholesteric layer, two cholesteric layers of different colors (Cholesteric based Beam Splitters—CBSs), a dichroic layer, or any other material that can perform beam splitting.

Pathlength matched prism assemblies may be described, for example, as prism assemblies where light pathlengths between faces of the beam splitting components having microdisplays mounted thereon (processing faces of the prism assembly) and a reference plane are equivalent. For example, pathlength distances from any of the processing faces to a reference plane (such as an exit face of the prism assembly, or, for example, an intermediate focal plane) are equivalent. Thus, individual light beams in each of the separately colored light beams corresponding to a same image pixel, once modulated and reflected off the microdisplays, and after passing back through its corresponding processing face, arrive at the reference plane after traveling the same distance. And, since the pathlengths within the prism are matched (a pathlength matched prism assembly), distances traveled within the prism by the light beams modulated and reflected from the microdisplays are also the same.

The prism components themselves are not precise enough, particularly in mass quantity production, to affirmatively bond the prism components directly together and end up with matched pathlengths in the prism assembly. However, Berman et al., U.S. patent application Ser. No. 10/202,595, filed Jul. 24, 2002, entitled "Method and Apparatus for Configuration and Assembly of a Video Projection Light Management System", the contents of which are incorporated herein by reference in their entirety, describes construction of a pathlength matched prism assembly in which standard mass produced optical components may be arranged in pathlength matched positions (e.g., fixed to a plate or frame, and then spaces between the components are filled with an optical coupling fluid such as mineral oil or other commercially available index matching fluid). All of the devices and construction techniques described in the above referenced patent application may be applied to the construction of prism assemblies with cholesteric based beam splitting devices as well.

In addition, individual beam splitting components of the prism assembly may themselves be constructed as pathlength matched beamsplitters (beamsplitters set in beamsplitter pathlength matched positions). Construction techniques for pathlength matched beamsplitters are described in Detro, U.S. patent application Ser. No. 10/251,225, filed Sep. 20, 2002, entitled "Pathlength Matched Beam Splitter and Method and Apparatus for Assembly", the contents of which are incorporated herein by reference in their entirety.

Input light 412 is directed at an input face of kernel 410. The input light 412 is, for example, polarized light that has been homogenized, shaped, and had undesirable wavelengths (e.g., UV light) removed.

An illuminator 430 comprises a curved (e.g., spherical) interior surface 435. The illuminator 430 includes at least one light source. In this example, the illuminator comprises 3 light sources, 440A, 440B, and 440C. The light sources are, for example, light sources having a consistent visible light spectra. In one embodiment, the light sources have different spectras. For example, light source 440B is a light source that is stronger in red or blue wavelengths compared to one or more of the other light sources. The selection of light sources and the spectra of the individual light sources are chosen to provide a balanced spectra to the human eye in image projected onto the display screen 475. For example, if the optical components of the prism assembly and light integrator are made of glass, and therefore highly absorptive of blue wavelengths, the light sources may be chosen to emphasize blue wavelengths. Counterbalancing any such selection are considerations as to the sensitivity of the human eye.

A polarizing element 450 provides polarized light which enters a light integrating stick 455. The polarizing element 450 is, for example, a p-polarized light reflector, and operates as discussed above so that the light entering the light integrating stick is s-polarized. In another embodiment, the polarizing element 450 is a s-polarized light reflector so that light entering the light integrating stick 455 is p-polarized.

When utilized, the light integrating stick 455 further homogenizes and shapes the polarized light. However, the integrating stick is optional because the integrating enclosure itself homogenizes and shapes the light. Lenses and mirror(s) 460 direct the polarized, homogenized, and shaped light to the input face of kernel 412.

Figure 5:
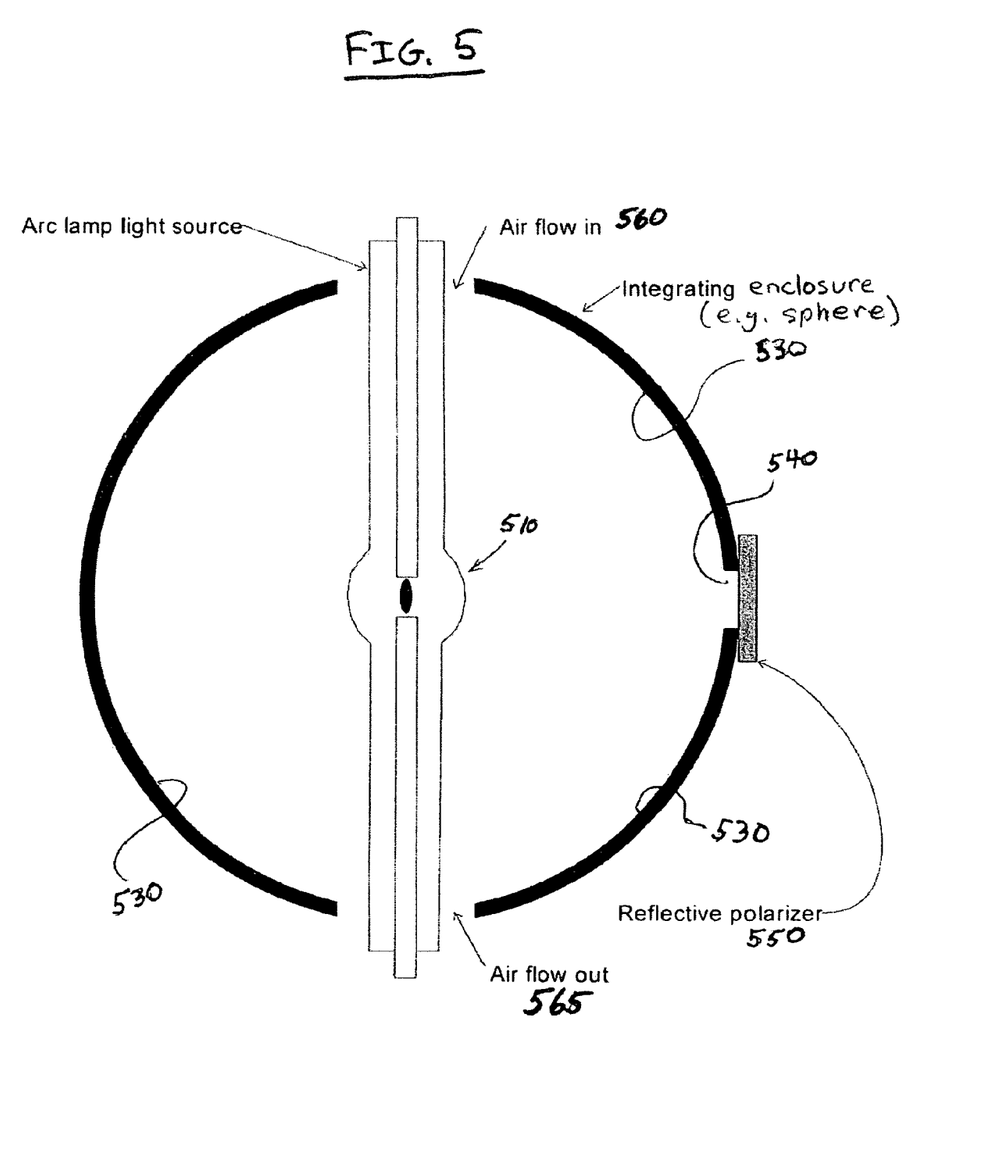
FIG. 5 is a drawing of an enclosed lamp illuminator 500 according to an embodiment of the present invention.

FIG. 5 is a drawing of an enclosed lamp illuminator 500 according to an embodiment of the present invention. A light source 510 is enclosed within an integrating enclosure 520. In the illustrated embodiment, the integrating enclosure 500 is a sphere, however, other shapes may be utilized. By fully enclosing the light source 510, there is no need for a reflector on the lamp.

Light emitted by the lamp 510 is scattered by impact with a highly scattering wall 530 of the integrating enclosure. Multiple reflections or scattering of light impacting the wall serves to homogenize the intensity of the light within the integrating enclosure. Some of the light eventually encounters an exit aperture 540. A reflective linear polarizer 550 is positioned at the exit aperture 540. One polarization of light (S for example) exits the enclosure 520 through the exit aperture 540 and is passed by the reflective polarizer 550.

The exit aperture provides shape to the polarized light beam produced by the illuminator. Likely shapes are round, square, or rectangular. Preferably, the exit aperture 540 is shaped in proportion to a "display" or optical area of a modulator configured to operate on the light exiting the enclosure. The modulator itself is proportional to, for example, a modern wide screen television and/or monitor.

The other polarization, the P component, is reflected back into the integrating enclosure (e.g., hollow sphere). This portion of the light beam once again scatters multiple times within the integrating enclosure. In doing so, the light is fully depolarized. And, eventually, some of the depolarized light will encounter the exit aperture where, once again, the S polarized component will be transmitted. The P polarized component is again recirculated. Since the integrating enclosure can be highly efficient, most of the light eventually leaves the integrating enclosure with a S polarization.

Several points concerning the configuration of the illuminator illustrated in FIG. 5 are as follows:

The illuminator can output either P or S linearly polarized light. The orientation of the axis of linear polarization is determined by the orientation of the transmission axis of the reflective polarizer located at the exit aperture.

The integrating enclosure can be a hollow ball in which the inner wall is coated with a highly reflective white material.

Alternately, the integrating enclosure can be a cavity in a block of highly reflective ceramic. In this case, the enclosure may be formed from two or more components.

One advantage of the disclosed approach is that it is possible to utilize an arc lamp with a larger arc gap. Such a light source will generally have a longer life time than a lamp with a shorter arc and that outputs a similar total amount of light.

As noted in FIG. 5, the lamp 510 is centered in the enclosure. In other embodiments, the lamp is positioned off center. An off-center position of the lamp may be advantageous in that more or all of the light impacting the reflective polarizer 550 is reflected or further homogenized before exiting the enclosure.

It is desirable to cool the lamp. In the illustrated embodiment, air can be injected into the integrating enclosure at one end of the lamp and withdrawn at the other end. As shown in FIG. 5, the integrating enclosure 520 is open at opposite ends of the lamp 510 allowing for air flow in 560 and air flow out 565. Openings at opposite ends of the enclosure facilitate placement of the lamp 510 in the enclosure and for the provision of electrical connections to the lamp 510. In addition, the illustrated arc lamp has a shadow, or at least a penumbra at opposite ends of the lamp, and cooling vents and electrical connections at these positions will have less adverse effects on the overall efficiency of the illuminator. Thus, the present invention includes placement of air vents and other aberrations (e.g., electrical connections) of the integrating enclosure at a shadow or penumbra of the lamp.

Figure 6:
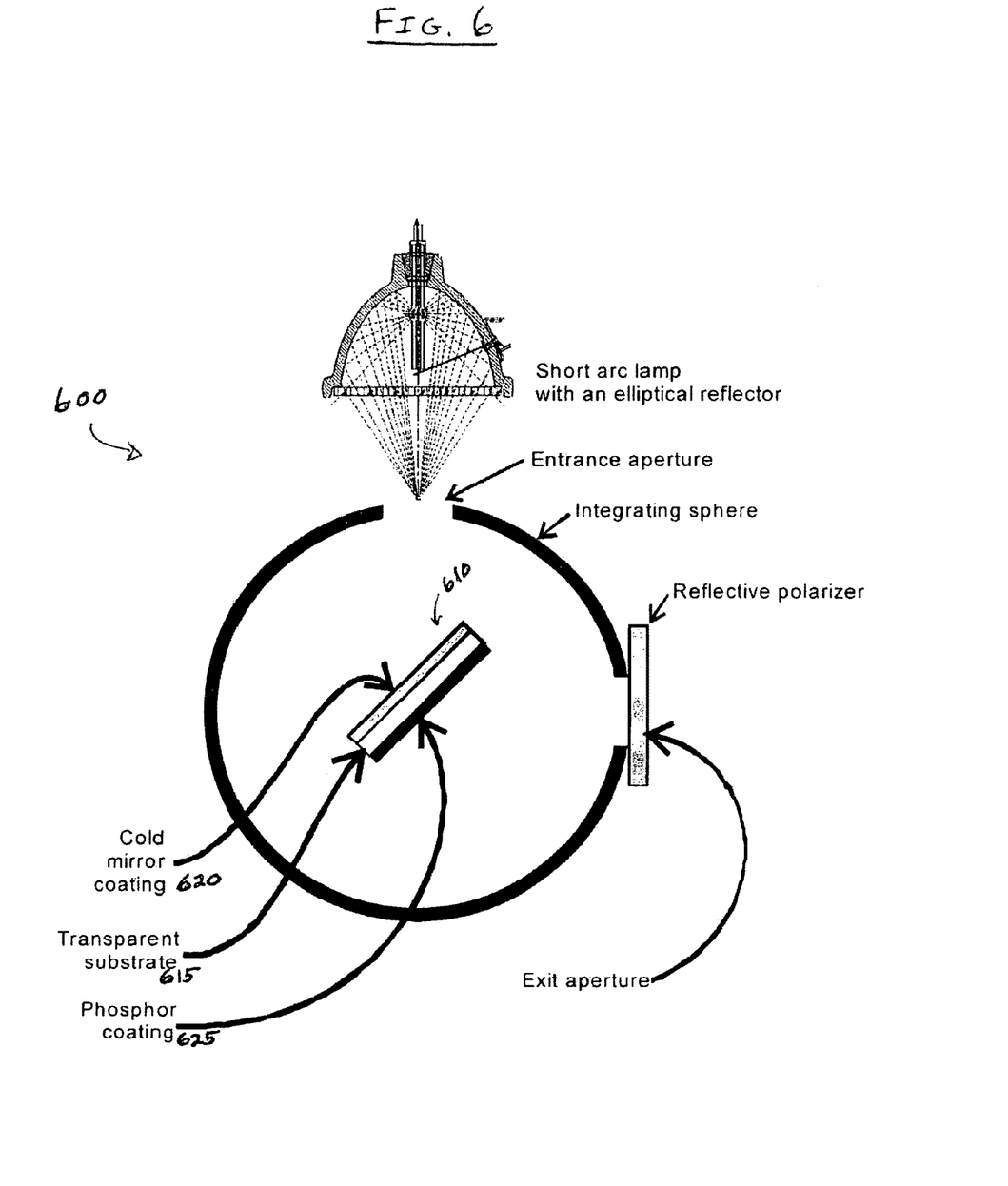
FIG. 6 is a drawing of an illuminator configuration using a coated substrate to convert ultraviolet lights to visible light according to an embodiment of the present invention.

The light sources will typically produce various amounts of ultraviolet light in addition to visible light. Thus, embodiments of illuminators according to the present invention may be enhanced by the inclusion of an ultraviolet light conversion. FIG. 6 is a drawing of an illuminator configuration 600 using a coated substrate 610 to convert ultraviolet light to visible light according to an embodiment of the present invention.

The coated substrate 610 is located within the integrating sphere so as to intersect a direct path (input beam) of light from the short arc lamp. The coated substrate 610 is, for example, oriented at a 45° angle to the axis of the input beam.

A substrate 615 is made of a material that has a high transmission in the ultraviolet wavelength, such as fused quartz. An upper side of the substrate is a "cold mirror" thin film coating 620. The cold mirror 620 is a coating that reflects visible light but transmits ultraviolet light. After reflection, the visible light interacts with the integrating sphere and the reflective polarizer as described previously.

The ultraviolet portion of the input light is transmitted by the cold mirror coating and travels through the substrate where it then impacts the lower surface of the substrate. The lower side of the substrate is coated with a phosphor 625 that absorbs ultraviolet light and reradiates visible light. This new visible light component also goes on to interact with the integrating sphere and the reflective polarizer similar to the visible light that was initially reflected as previously described. The reradiated light increases the light output by the illuminator.

The phosphor can be chosen to reradiate light in any part of the visible spectrum. Preferably, a system in which the illuminator is utilized is tested to determine deficiencies in the visible light spectrum and the phosphor is chosen to reradiate in the portion of the visible spectrum in which the system most defficient. For example, a prism assembly constructed of glass components might absorb a high percentage of blue light transmitted through the prism assembly. Therefore, assuming all other factors being equal, an engineering decision for that system may be made to boost the blue wavelengths to better balance light output from the system by utilizing a phosphor that converts the ultraviolet light to blue wavelength light. The phosphor decision may also be made based on other factors such as the sensitivity of a viewer to the various wavelengths (e.g., boost colors in the light to which a viewer is most sensitive), or a combination of factors (e.g. a combination of system and physiological factors).

Although the present invention is mainly directed at illuminators, the following U.S. patent applications are incorporated herein by reference, in their entirety, each providing one or more techniques that are combinable with the present invention to produce high quality light management systems and/or other optional products:

Berman et al., U.S. patent application Ser. No. 10/342,219 entitled "Design Of Prism Assemblies And Kernel Configurations For Use In Projection Systems" filed Jan. 13, 2003;

Berman, U.S. patent application Ser. No. 10/382,766 entitled "Method and Apparatus for Increasing Microdisplay Black State in Light Management Systems and Flexibility to Utilize Polarized or Unpolarized Input Light" filed Mar. 5, 2003;

Berman, U.S. Provisional Patent Application No. 60/405, 462 entitled "Prism Assembly With Cholesteric Reflectors" filed Aug. 23, 2002; and Berman et al., U.S. patent application Ser. No. 10/371,835 entitled "Method And Apparatus For Use And Construction Of Compensated Higher Order Waveplates" filed Feb. 20, 2003.

Any of the light sources illustrated in the referenced patent applications or light sources used in conjunction with any devices described therein may be replaced with a light source according to the present invention. The light source so replaced may then be "tuned" as described herein to provide optimal or near optimal spectra for any particular application.

Obviously, numerous modifications and variations of the present invention are possible in light of the above teachings. It is therefore to be understood that the invention may be practiced otherwise than as specifically described herein.

What is claimed and desired to be secured by Letters Patent of the United States is:

1. A device, comprising:
   an integrating enclosure comprising an entrance aperture and an exit aperture;
   a substrate having an incident side and an output side positioned inside the integrating enclosure;
   a reflective coating on the incident side of the substrate;
   a phosphor located at the output side of the substrate; and
   a reflective linear polarizer coupled to the exit aperture.

2. The device according to claim 1, wherein the reflective coating is sensitive to and reflects visible light, and the phosphor is a phosphor that converts non-visible light into visible light.

3. The device according to claim 2, wherein the non visible light is ultraviolet light.

4. The device according to claim 1, wherein an interior surface of the integrating enclosure is reflective.

5. The device according to claim 1, further comprising at least one light source coupled to the entrance aperture and configured to direct light into the integrating enclosure toward the incident side of the substrate.

6. The device according to claim 1, wherein the integrating enclosure further comprises a second entrance aperture.

7. The device according to claim 6, further comprising:
   a first light source coupled to the entrance aperture; and
   a second light source coupled to the second entrance aperture;
   wherein the first light source and the second light source are both configured to direct light into the integrating enclosure.

8. The device according to claim 7, wherein a spectral emission of the first light source is different from a spectral emission of the second light source.

9. The device according to claim 7, wherein the spectral emission of the first light source is stronger in blue wavelengths when compared to the second light source.

10. The device according to claim 7, wherein the spectral emission of the second light source is stronger in red wavelengths when compared to the first light source.

11. The device according to claim 7, wherein the spectral emission of the second light source is stronger in green wavelengths when compared to the first light source.

12. The device according to claim 7, wherein both of the light sources are directed toward the incident side of the substrate.

13. The device according to claim 7, further comprising:
   a second substrate having an incident side and an output side and having a reflective coating on the incident side of the second substrate and a phosphor located at the output side of the second substrate;
   wherein the first light source is directed to the reflecting side of the first substrate and the second light source is directed toward the reflecting side of the second substrate.

14. The device according to claim 13, wherein the phosphor of the substrate and the phosphor of the second substrate reradiate light in different wavelengths.

15. The device according to claim 1, wherein the reflective polarizer is a p-polarized light reflector.

16. The device according to claim 1, wherein the reflective polarizer is a s-polarized light reflector.

17. The device according to claim 1, wherein an interior of the integrating enclosure is spherical.

18. The device according to claim 1, wherein the integrating enclosure comprises a sphere shaped interior.

19. The device according to claim 1, further comprising an integrating rod coupled to the exit aperture via the reflective polarizer.

20. A Liquid Crystal on Silicon (LCoS) projection television, comprising:
   a lighting management system comprising,
   a prism assembly having an input face, a set of processing faces, and an output face, the prism assembly being configured to split an input light beam into component light beams, individually direct the component light beams to an individual one of the processing faces, recombine portions of the component light beams reflected from the processing faces, and output the recombined light beams through the output face; and
   a light source, comprising,
   an integrating enclosure comprising an entrance aperture and an exit aperture,
   a phosphor configured to absorb non-visible light and reradiate visible light, and
   a reflective linear polarizer coupled to the exit aperture;
   wherein:
   the prism assembly further comprises a set of reflective microdisplays,
   each microdisplay is mounted on one of the processing faces and configured to modulate and reflect light directed at the processing face upon which the microdisplay is mounted; and
   each microdisplay is configured to modulate light with content corresponding to a color of the component light beam directed at the processing face upon which the microdisplay is mounted.

21. The LCoS television according to claim 20, wherein an interior of the integrating enclosure is spherical.

22. The LCoS television according to claim 20, wherein the integrating enclosure further comprises,
   a plurality of input apertures and a plurality of light sources, each light source coupled to one of the input apertures, and
   a visible light reflector positioned between the light sources and the phosphor; and
   each light source configured to direct light toward the visible light reflector and phosphor.

23. The LCoS television according to claim 22, wherein at least two of the light sources have different emission spectra.

24. The LCoS television according to claim 23, wherein one of the light sources has an emission spectra stronger in blue wavelengths when compared to another of the light sources.

25. The LCoS television according to claim 23, wherein one of the light sources has an emission spectra stronger in red wavelengths when compared to another of the light sources, further comprising an integrating rod disposed between the reflective polarizer and the input face of the prism assembly.

26. The LCoS television according to claim 25, further comprising a clean-up polarizer disposed between the integrating rod and the prism assembly input face.

27. The LCoS television according to claim 20, wherein the light source is one of a short, medium, and large arc mercury lamp.

* * * * *